(12) United States Patent (10) Patent No.: US 8,360,581 B2
Yabui et al. (45) Date of Patent: Jan. 29, 2013

(54) STEREOSCOPIC IMAGE DISPLAY SYSTEM

(75) Inventors: Tomohiko Yabui, Hakusan (JP); Hiroshi Ito, Hakusan (JP)

(73) Assignee: Eizo Nanao Corporation, Ishikawa (JP)

( * ) Notice: Subject to any disclaimer, the term of this patent is extended or adjusted under 35 U.S.C. 154(b) by 578 days.

(21) Appl. No.: 12/467,436

(22) Filed: May 18, 2009

(65) Prior Publication Data

US 2009/0290126 A1 Nov. 26, 2009

(30) Foreign Application Priority Data

May 23, 2008 (JP) ................................. 2008-135837

(51) Int. Cl.
*G03B 21/00* (2006.01)
(52) U.S. Cl. .......................................................... 353/7
(58) Field of Classification Search ................. 353/7, 8, 353/9; 359/462–477; 348/42–60
See application file for complete search history.

(56) References Cited

U.S. PATENT DOCUMENTS

| 6,101,008 | A | * | 8/2000 | Popovich ......................... 359/15 |
| 6,323,999 | B1 | * | 11/2001 | Ueda et al. ..................... 359/443 |
| 6,473,115 | B1 | | 10/2002 | Harman |
| 2008/0036969 | A1 | * | 2/2008 | Otsuka et al. ..................... 353/7 |

FOREIGN PATENT DOCUMENTS

| JP | 10-82970 A | 3/1998 |
| JP | 2000-47138 A | 2/2000 |
| JP | 2001-66696 A | 3/2001 |
| JP | 2004-258594 A | 9/2004 |
| JP | 2005-84033 A | 3/2005 |
| JP | 2006-113476 A | 4/2006 |
| JP | 2007-264261 A | 10/2007 |
| JP | 2010002894 A | * | 1/2010 |

OTHER PUBLICATIONS

Notification of Reasons for Refusal for the Application No. 2009-121036 from Japan Patent Office mailed May 31, 2011.

* cited by examiner

*Primary Examiner* — Thanh Luu
*Assistant Examiner* — Danell L Owens
(74) *Attorney, Agent, or Firm* — Cheng Law Group, PLLC

(57) ABSTRACT

This invention provides a stereoscopic image display system that allows a plurality of experiencing persons to visually recognize stereoscopic images by their naked eyes at one time.

In correspondence with a distance between eyes of an experiencing person, a plurality of projectors and a plurality of half mirrors are arranged around a periphery of a retroreflective sheet placed horizontally. The respective projectors receive parallax images of an object as a display target which are taken along a circumferential direction of the object. Image light beams (left and right parallax images) emitted from the adjacent two projectors are reflected from the half mirrors and then enter the retroreflective sheet. The two incident image light beams are reflected from the retroreflective sheet in directions of incidence thereof, respectively. The two reflected light beams pass through the half mirrors and then separately enter the right and left eyes of the experiencing person. Thus, the experiencing person can visually recognize a stereoscopic image of the object, which is seen from every direction, at the entire periphery of the retroreflective sheet.

15 Claims, 8 Drawing Sheets

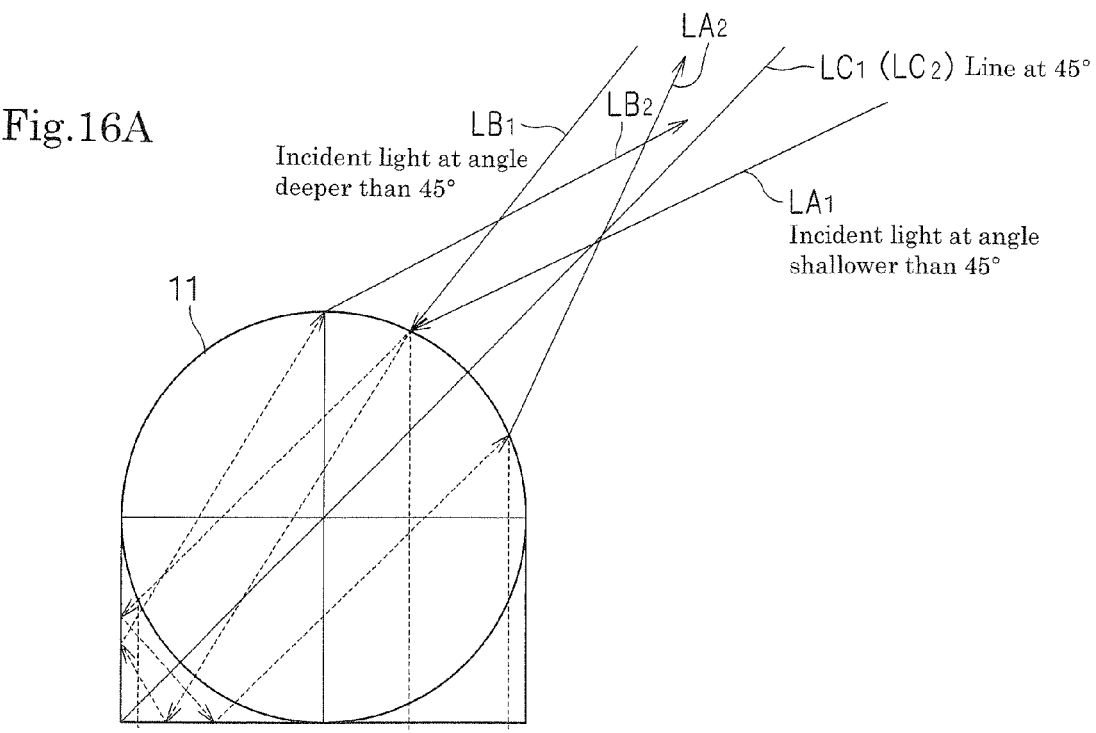
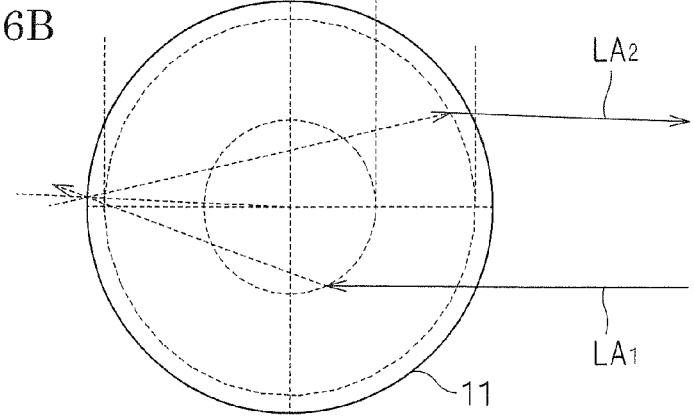
Fig.16A
Fig.16B

STEREOSCOPIC IMAGE DISPLAY SYSTEM

BACKGROUND OF THE INVENTION (1) Field of the Invention

This invention relates to a stereoscopic image display system that directs images with binocular parallax (i.e., an image for right eye and an image for left eye) separately at left and right eyes of an experiencing person to allow the experiencing person to visually recognize the images as a stereoscopic image without using special glasses.

(2) Description of the Related Art

As stereoscopic image display systems of this type, conventionally, there have been known those using a retroreflective screen (e.g., refer to JP 2006-113476 A (paragraphs 0014 to 0059, FIGS. 1 to 7)). With reference to FIG. 1 and FIG. 2, hereinafter, description will be given of a conventional stereoscopic image display system. FIG. 1 is a side view used for description of a principle of a display apparatus using a retroreflective screen. FIG. 2 is a plan view showing a schematic configuration of a conventional stereoscopic image display system.

In the display apparatus using the retroreflective screen, as shown in FIG. 1, the retroreflective screen 21 is disposed in a standing state on a line of sight of an experiencing person M. Moreover, a half mirror 22 is provided between the experiencing person M and the retroreflective screen 21. The half mirror 22 has a plane of incidence facing a facial surface of the experiencing person M. Further, a projector 23 is provided for emitting an image light beam L1 at a predetermined angle of view to the half mirror 22. The angle of view of the image light beam L1 emitted from the projector 23 and an angle of incidence of the image light beam L1 relative to the half mirror 22 are set appropriately, so that a field of view of the experiencing person M who sees the retroreflective screen 21 through the half mirror 22 in an image experience region is superimposed on an image light beam L2 obtained when the image light beam L1 reflected from the half mirror 22 is projected onto the retroreflective screen 21. Since the retroreflective screen 21 has a characteristic of reflecting the image light beam L2 in a direction of incidence of the image light beam L2, the image light beam L2 projected on the retroreflective screen 21 is reflected in the direction of incidence thereof, passes through the half mirror 22 and enters eyes of the experiencing person M. Thus, the experiencing person M can visually recognize the image light beam L2.

The conventional stereoscopic image display system is configured by use of the mechanism of display described above. Hereinafter, reference is made to FIG. 2. This stereoscopic image display system includes a projector 23R that emits an image light beam L1R for right eye, a projector 23L that emits an image light beam L1L for left eye, two half mirrors 22A and 22B, and the like. The image light beam L1R for right eye is emitted from the projector 23R, is reflected from the half mirrors 22A and 23B in this order, and is projected onto the retroreflective screen 21. The projected image light beam L2R is reflected in a direction of incidence thereof, passes through the half mirrors 22A and 22B, and enters the right eye of the experiencing person M. On the other hand, the image light beam L1L for left eye is emitted from the projector 23L, passes through the half mirror 22A, is reflected from the half mirror 22B, and is projected onto the retroreflective screen 21. The projected image light beam L2L is reflected in a direction of incidence thereof, passes through the half mirrors 22A and 22B, and enters the left eye of the experiencing person M. Since the image light beams L2R and L2L form parallax images, the experiencing person M can visually recognize a stereoscopic image.

However, the conventional stereoscopic image display system having the configuration described above has the following problem. That is, although the stereoscopic image display system allows an experiencing person to visually recognize a stereoscopic image by his/her naked eyes, with a relatively simple configuration, only a specific experiencing person (only one experiencing person) can visually recognize a stereoscopic image, but a plurality of experiencing persons can not visually recognize stereoscopic images at one time.

SUMMARY OF THE INVENTION

This invention has been devised in view of the circumferences described above and aims to provide a stereoscopic image display system that allows a plurality of experiencing persons to visually recognize stereoscopic images by their naked eyes at one time.

In order to solve the problems described above, this invention adopts the following configurations.

That is, a first aspect of this invention is directed to a stereoscopic image display system that directs images with binocular parallax separately at left and right eyes of an experiencing person to allow the experiencing person to visually recognize a stereoscopic image, the system including: a retroreflection optical part having a plane of incidence oriented in a substantially horizontal direction, and reflecting a light beam, which is incident on the plane of incidence, in a direction of incidence of the incident light beam; a half mirror disposed so as to traverse a field of view of an experiencing person who sees the retroreflection optical part in a visually recognizable region set previously around a periphery of the retroreflection optical part; an image light beam emission part emitting an image light beam toward the half mirror from an opposite side to a side where the experiencing person is present; and an image transmission part transmitting an image to the image light beam emission part, wherein the half mirror reflects, toward the retroreflection optical part, the image light beam emitted from the image light beam emission part, the image light beam emission part and the half mirror are in a positional relation set such that the image light beam reflected from the half mirror becomes optically conjugate with the field of view of the experiencing person, a plurality of projection units each including the half mirror and the image light beam emission part are arranged around the periphery of the retroreflection optical part at intervals set such that a distance between the visually recognizable regions corresponding to the adjacent projection units becomes equal to a distance between eyes of the experiencing person, and the image transmission part transmits parallax images of an object as a display target seen from directions corresponding to the arrangement positions of the respective projection units to the image light beam emission parts of the respective projection units in accordance with the arrangement positions of the respective projection units.

According to the first aspect of this invention, when the position where the experiencing person is present, that is, the left and right eyes of the experiencing person are in the visually recognizable region, for example, the image light beam emitted from the image light beam emission part of the projection unit corresponding to the position of the right eye is reflected from the half mirror and then enters the plane of incidence of the retroreflection optical part. The image light beam enters the retroreflection optical part, is reflected in the direction of incidence thereof, passes through the half mirror, and enters the right eye of the experiencing person. Likewise, the image light beam emitted from the image light beam emission part of the projection unit adjoining the projection unit described above, that is, the projection unit corresponding to the position of the left eye is reflected from the half mirror and the retroreflection optical part, passes through the half mirror, and enters the left eye of the experiencing person. The two image light beam emission parts receive the parallax images of the object, which are taken from the directions corresponding to the arrangement positions of the two projection units, from the image transmission part. Therefore, the experiencing person can visually recognize the stereoscopic image of the object seen from the direction of presence of the experiencing person. In a case where another experiencing person is present in a different position (a different visually recognizable region) around the periphery of the retroreflection optical part, the two projection units corresponding to the position of the experiencing person emit image light beams corresponding to parallax images of the object seen from a direction of presence of the experiencing person. The two image light beams separately enter left and right eyes of the experiencing person. Thus, the experiencing person can visually recognize a stereoscopic image of the object seen from the direction of presence of the experiencing person. Accordingly, the plurality of experiencing persons who are around the periphery of the retroreflection optical part can visually recognize the stereoscopic images of the object seen from the respective directions of presence of the experiencing persons, at one time.

A second aspect of this invention is directed to a stereoscopic image display system that directs images with binocular parallax separately at left and right eyes of an experiencing person to allow the experiencing person to visually recognize a stereoscopic image, the system including: a retroreflection optical part having a plane of incidence oriented in a substantially horizontal direction, and reflecting a light beam, which is incident on the plane of incidence, in a direction of incidence of the incident light beam; an image light beam emission part emitting an image light beam toward the retroreflection optical part along a line of sight of an experiencing person who sees the retroreflection optical part in a visually recognizable region set previously around a periphery of the retroreflection optical part; and an image transmission part transmitting an image to the image light beam emission part, wherein a plurality of image light beam emission parts each equal in configuration to the image light beam emission part described above are arranged around the periphery of the retroreflection optical part at intervals set such that a distance between the visually recognizable regions corresponding to the adjacent image light beam emission parts becomes equal to a distance between eyes of the experiencing person, and the image transmission part transmits parallax images of an object as a display target seen from directions corresponding to the arrangement positions of the respective image light beam emission parts to the respective image light beam emission parts in accordance with the arrangement positions of the respective image light beam emission parts.

According to the second aspect of this invention, when the position where the experiencing person is present, that is, the left and right eyes of the experiencing person are in the visually recognizable region, for example, the image light beam emitted from the image light beam emission part of the projection unit corresponding to the position of the right eye enters the plane of incidence of the retroreflection optical part. The image light beam enters the retroreflection optical part, is reflected in the direction of incidence thereof, and returns to the image light beam emission part. Consequently, the image light beam emission part disadvantageously blocks the image light beam, and the experiencing person fails to visually recognize the light beam retroreflected from the retroreflection optical part. However, the light beam, which is incident on the retroreflection optical part, is not reflected entirely in the direction of incidence thereof, but is reflected partly while being diffused about the direction of incidence thereof, depending on the accuracy of the retroreflection optical part. This diffused and reflected light beam enters the eye (herein, the right eye) of the experiencing person. Likewise, the image light beam emitted from the image light beam emission part of the projection unit adjoining the projection unit described above, that is, the projection unit corresponding to the position of the left eye is reflected from the retroreflection optical part, and the diffused and reflected light beam of this reflected light beam enters the left eye of the experiencing person. The two image light beam emission parts receive the parallax images of the object, which are taken from the directions corresponding to the arrangement positions of the two projection units, from the image transmission part. Therefore, the experiencing person can visually recognize the stereoscopic image of the object seen from the direction of presence of the experiencing person. Likewise, another experiencing person in a different position (a different visually recognizable region) around the periphery of the retroreflection optical part can also visually recognize a stereoscopic image of the object seen from a direction of presence of the experiencing person. As described above, the plurality of experiencing persons who are around the periphery of the retroreflection optical part can visually recognize the stereoscopic images of the object seen from the respective directions of presence of the experiencing persons, at one time. The stereoscopic image display system according to the second aspect of this invention utilizes the light beam reflected from the retroreflection optical part while being diffused and adopts no half mirror. As a result, the stereoscopic image display system according to the second aspect of this invention allows simplification of the configuration thereof as compared with that according to the first aspect of this invention.

A third aspect of this invention is directed to a stereoscopic image display system that directs images with binocular parallax separately at left and right eyes of an experiencing person to allow the experiencing person to visually recognize a stereoscopic image, the system including: a retroreflection optical part having a plane of incidence oriented in a substantially horizontal direction, and reflecting a light beam which is incident on the plane of incidence while refracting the light beam in a direction which is equal to a direction of incidence of the incident light beam in plan view, but deviates upward or downward from the direction of incidence in side view; an image light beam emission part emitting an image light beam toward the retroreflection optical part in a direction, in plan view, equal to a line of sight of an experiencing person who sees the retroreflection optical part in a visually recognizable region set previously around a periphery of the retroreflection optical part from a position, in side view, deviating downward or upward from a region where the light beam reflected from the retroreflection optical part passes; and an image transmission part transmitting an image to the image light beam emission part, wherein a plurality of image light beam emission parts each equal in configuration to the image light beam emission part described above are arranged around the periphery of the retroreflection optical part at intervals set such that a distance between the visually recognizable regions corresponding to the adjacent image light beam emission parts becomes equal to a distance between eyes of the experiencing person, and the image transmission part transmits parallax images of an object as a display target seen from directions corresponding to the arrangement positions of the respective image light beam emission parts to the respective image light beam emission parts in accordance with the arrangement positions of the respective image light beam emission parts.

According to the third aspect of this invention, when the position where the experiencing person is present, that is, the left and right eyes of the experiencing person are in the visually recognizable region, for example, the image light beam emitted from the image light beam emission part of the projection unit corresponding to the position of the right eye enters the plane of incidence of the retroreflection optical part. The retroreflection optical part used in the third aspect of this invention reflects the light beam, which is incident on the plane of incidence thereof, while refracting the light beam in the direction which is equal to the direction of incidence in plan view, but deviates upward or downward from the direction of incidence in side view. Accordingly, the light beam reflected from the retroreflection optical part returns while passing over or under the image light beam emission part; therefore, the image light beam emission part does not block this refracted and reflected light beam. Thus, the reflected light beam, which is reflected from the retroreflection optical part while being refracted, enters the eye (herein, the right eye) of the experiencing person. Likewise, the image light beam emitted from the image light beam emission part of the projection unit adjoining the projection unit described above, that is, the projection unit corresponding to the position of the left eye is reflected from the retroreflection optical part while being refracted, and the reflected light thereof enters the left eye of the experiencing person. The two image light beam emission parts receive the parallax images of the object, which are taken from the directions corresponding to the arrangement positions of the two projection units, from the image transmission part. Therefore, the experiencing person can visually recognize the stereoscopic image of the object seen from the direction of presence of the experiencing person. Likewise, another experiencing person in a different position (a different visually recognizable region) around the periphery of the retroreflection optical part can also visually recognize a stereoscopic image of the object seen from a direction of presence of the experiencing person. As described above, the plurality of experiencing persons who are around the periphery of the retroreflection optical part can visually recognize the stereoscopic images of the object seen from the respective directions of presence of the experiencing persons, at one time. The stereoscopic image display system according to the third aspect of this invention utilizes the light beam reflected from the retroreflection optical part while being refracted and therefore can prevent degradation in brightness of the stereoscopic image to be recognized visually. Further, the stereoscopic image display system according to the third aspect of this invention adopts no half mirror and therefore allows simplification of the configuration thereof.

Preferably, each of the stereoscopic image display systems according to the first to third aspects of this invention further include: an experiencing person detection part detecting an experiencing person in the visually recognizable region around the periphery of the retroreflection optical part; and a control part, when the experiencing person detection part detects the experiencing person, activating only the image light beam emission parts corresponding to the position of the detected experiencing person and deactivating the remaining image light beam emission parts.

With this configuration, when the experiencing person detection part detects the experiencing person who is around the periphery of the retroreflection optical part, the control part activates only the image light beam emission parts corresponding to the position of the detected experiencing person and deactivates the remaining image light beam emission parts. Therefore, it is possible to avoid wasteful emission of an image light beam in a direction of absence of an experiencing person, to reduce power consumption, and to lessen a burden on the image transmission part.

Preferably, each of the stereoscopic image display systems according to the first to third aspects of this invention further includes: an experiencing person detection part detecting an experiencing person in a predetermined area including the visually recognizable region around the periphery of the retroreflection optical part; and a control part, when the experiencing person detection part detects the experiencing person, activating the image light beam emission parts corresponding to the position of the detected experiencing person and the image light beam emission parts located in the predetermined area and deactivating the remaining image light beam emission parts located outside the predetermined area.

With this configuration, it is possible to avoid unnatural display due to delayed display upon activation of the deactivated image light beam emission part. Typically, the deactivated image light beam emission part can not achieve satisfactory brightness immediately even when being activated, resulting in the following disadvantage. That is, since the experiencing person moves and then the deactivated image light beam emission part corresponding to a new position of the experiencing person is activated, this activated image light beam emission part emits an image beam light with delay. In order to avoid this disadvantage, the experiencing person detection part detects an experiencing person in the predetermined area including the visually recognizable region around the periphery of the retroreflection optical part. When the experiencing person detection part detects the experiencing person in the predetermined area, all the image light beam emission parts corresponding to this area are activated. With this configuration, even when the experiencing person moves within this area, the image light beam emission parts corresponding to this area are activated previously, leading to prevention of delayed display.

In each of the stereoscopic image display systems according to the first to third aspects of this invention, preferably, the experiencing person detection part includes a plurality of sensors for detecting an experiencing person, and the control part activates the image light beam emission part when all the plurality of sensors detect the experiencing person.

With this configuration, it is possible to prevent erroneous detection of an experiencing person. More specifically, it is assumed that the stereoscopic image display system is configured such that a single sensor detects an experiencing person. In such a case, occasionally, this sensor erroneously detects a person who stands at a position apart from the visually recognizable region. Alternatively, this sensor is operated erroneously because of change in extraneous light, so that the image light beam emission part is activated undesirably. On the other hand, the stereoscopic image display system is configured such that the plurality of sensors detect an experiencing person and the image light beam emission part is activated only when all the plurality of sensors detect the experiencing person. With this configuration, it is possible to avoid the image light beam emission part from being activated undesirably even when one of the sensors is operated erroneously.

BRIEF DESCRIPTION OF THE DRAWINGS

For the purpose of illustrating this invention, there are shown in the drawings several forms which are presently preferred, it being understood, however, that this invention is not limited to the precise arrangement and instrumentalities shown.

FIG. 16A and FIG. 16B are a side view and a plan view each used for description of reflection of a light beam at a bullet-shaped glass bead used in the fourth embodiment.

DESCRIPTION OF THE PREFERRED EMBODIMENTS

With reference to the drawings, hereinafter, detailed description will be given of preferred embodiments of this invention.

<First Embodiment>

With reference to the drawings, description will be given of a first embodiment of this invention.

Figure 1:
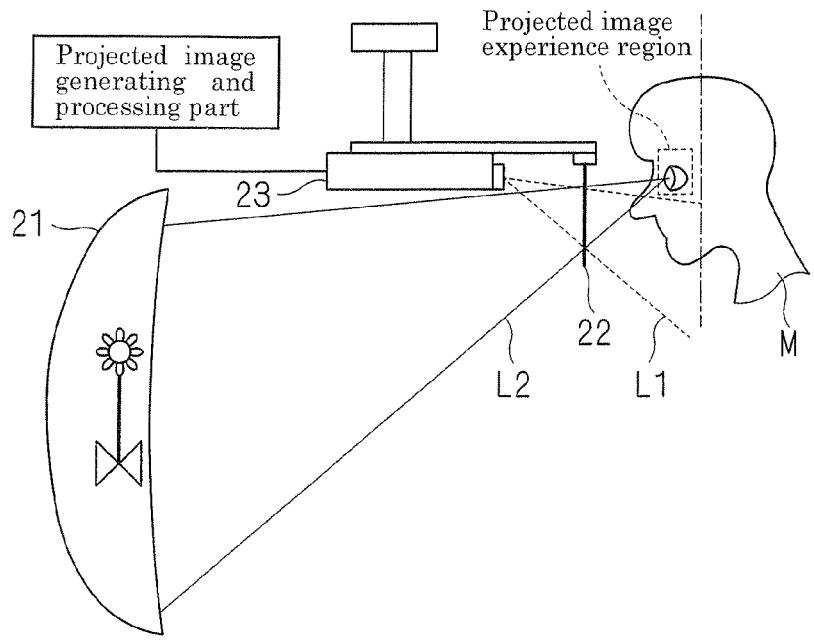
FIG. 1 is a side view used for description of a principle of a conventional display apparatus using a retroreflective screen.
Figure 2:
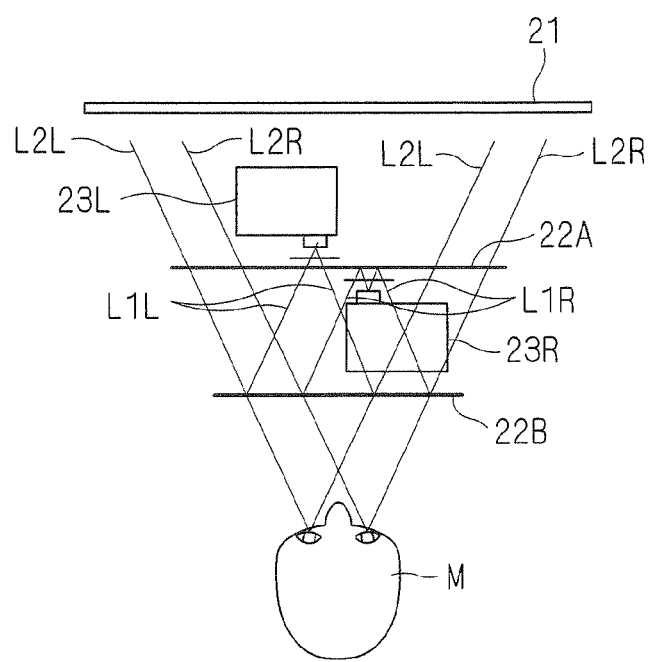
FIG. 2 is a plan view showing a schematic configuration of a conventional stereoscopic image display system.
Figure 3:
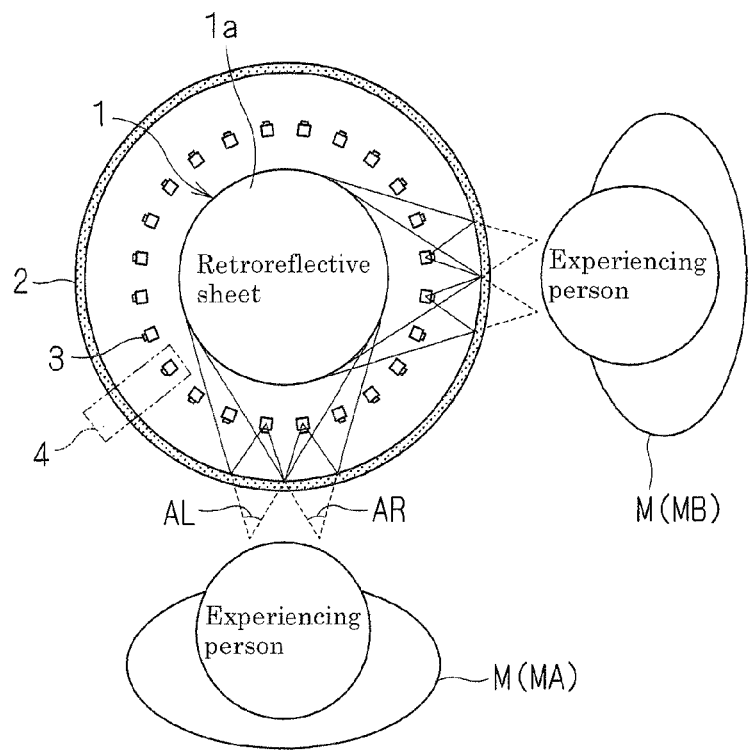
FIG. 3 is a plan view showing a schematic configuration of an optical system of a stereoscopic image display system according to a first embodiment.

FIG. 3 is a plan view showing a schematic configuration of an optical system of a stereoscopic image display system according to the first embodiment. It is to be noted that the stereoscopic image display system according to the first embodiment equates to the stereoscopic image display system according to the first aspect of this invention.

The stereoscopic image display system according to this embodiment directs images with binocular parallax (i.e., parallax images) separately at left and right eyes of an experiencing person M to allow the experiencing person M to visually recognize a stereoscopic image. A retroreflective sheet 1 is placed at a center of the optical system in a substantially horizontal position. A plurality of experiencing persons M (MA, MB, . . . ), who are in visually recognizable regions set previously around a periphery of the retroreflective sheet 1, can visually recognize stereoscopic images at one time without putting on special glasses.

Herein, the visually recognizable region refers to a positional range of the eyes of the experiencing person M who can visually recognize a stereoscopic image, that is, who can receive a parallax image light beam. In FIG. 3, for example, a region denoted by a symbol AL is the visually recognizable region for the left eye of the experiencing person MA. The left eye of the experiencing person MA in the visually recognizable region AL can receive the parallax image for left eye. Moreover, a region denoted by a symbol AR is the visually recognizable region for the right eye of the experiencing person MA. The right eye of the experiencing person MA in the visually recognizable region AR can receive the parallax image for right eye. Accordingly, the adjacent visually recognizable regions AL and AR (hereinafter, each of which is occasionally denoted by a symbol A if the two regions are not specifically distinguished from each other) are set such that a distance therebetween becomes equal to a distance between the eyes of the experiencing person M. The large number of visually recognizable regions A described above are set previously around the periphery of the retroreflective sheet 1.

The retroreflective sheet 1 is an optical sheet placed on a flat table or the like, and has a plane of incidence 1a oriented in a substantially horizontal direction to reflect an incident light beam in a direction of incidence of the incident light beam. Such a retroreflective sheet 1 can be formed in such a manner that a sheet is entirely coated with minute and spherical glass beads through an adhesive. This retroreflective sheet 1 equates to the retroreflection optical part according to this invention (the first aspect of this invention).

A plurality of half mirrors 2 are disposed around the periphery of the retroreflective sheet 1 so as to traverse a line of sight of the experiencing person M who sees the retroreflective sheet 1 in the visually recognizable region set previously around the periphery of the retroreflective sheet 1. The half mirrors 2 are arranged around the periphery of the retroreflective sheet 1 and are in the shape of a ring as a whole.

A plurality of projectors 3 are disposed around the periphery of the retroreflective sheet 1 while being arranged in a ring shape so as to emit image light beams toward the half mirrors 2 arranged in a ring shape from opposite sides to a side where the experiencing person M is present (i.e., a side where the experiencing person M visually recognizes a stereoscopic image). The half mirror 2 reflects the image light beam, which is emitted from the projector 3, toward the retroreflective sheet 1. The projector 3 equates to the image light beam emission part according to this invention. A combination of the half mirror 2 and the projector 3 corresponding to one visually recognizable region A is referred to as a projection unit 4. A plurality of projection units 4 described above are provided in correspondence with the visually recognizable regions set around the periphery of the retroreflective sheet 1. Moreover, the projection units 4 are arranged at intervals set such that the distance between the visually recognizable regions A corresponding to the adjacent projection units 4 becomes equal to the distance between the eyes of the experiencing person.

Figure 4A:
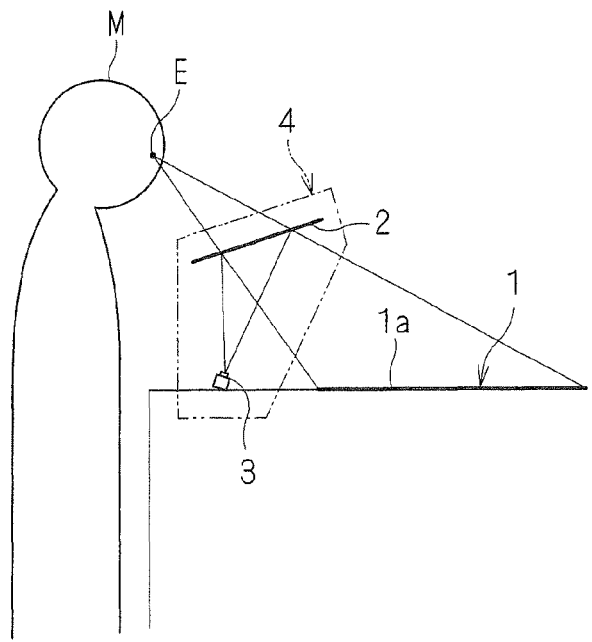
FIG. 4A and FIG. 4B are a side view and a plan view each showing a projection unit used in the first embodiment.
Figure 4B:
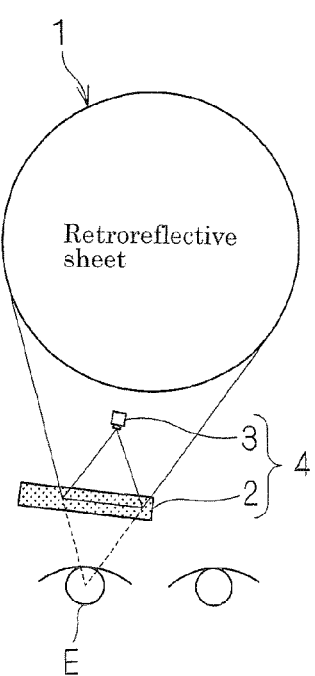

Reference is made to FIGS. 4A and 4B. FIG. 4A and FIG. 4B are a side view and a plan view each showing the projection unit. A positional relation between the projector 3 and the half mirror 2 which form one projection unit 4 is set such that the image light beam reflected from the half mirror 2 becomes optically conjugate with the field of view of the experiencing person M. That is, the eye E of the experiencing person M and the projector 3 are in a conjugate positional relation relative to the half mirror 2. Accordingly, the image light beam emitted from the projector 3 is reflected from the half mirror 2 and enters the retroreflective sheet 1. The image light beam enters the retroreflective sheet 1, is reflected in the direction of incidence thereof, passes through the half mirror 2, and enters the eye E (the right or left eye) of the experiencing person M.

Figure 5A:
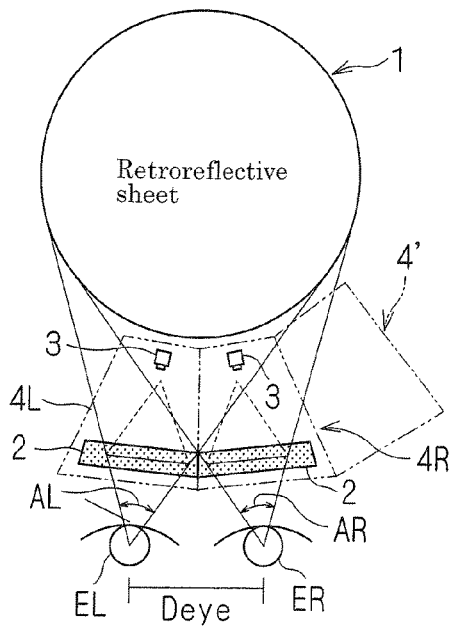
FIG. 5A is a view showing an arrangement relation between adjacent projection units and FIG. 5B is a view used for description of an angle between the adjacent projection units.
Figure 5B:
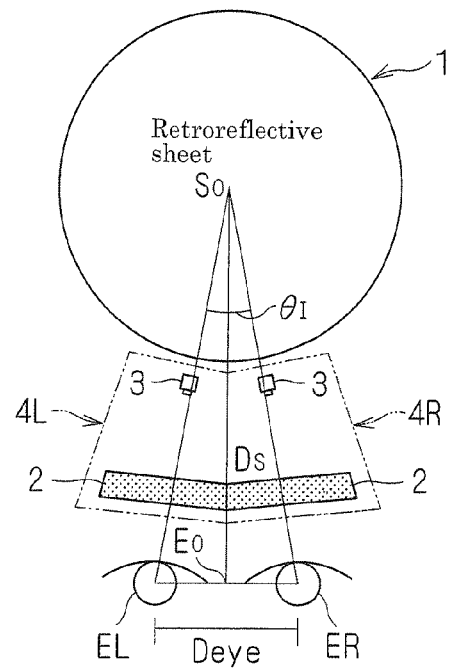

With reference to FIGS. 5A and 5B, description will be given of an arrangement relation between the adjacent projection units 4. FIG. 5A is a view showing the arrangement of the adjacent projection units, and FIG. 5B is a view used for description of an angle between the adjacent projection units. As shown in FIG. 5A, the adjacent projection units 4L and 4R are arranged around the periphery of the retroreflective sheet 1 such that the distance between the visually recognizable regions AL and AR becomes equal to the distance DEYE between the eyes EL and ER of the experiencing person M. Accordingly, in a case where the image light beam emitted from the projector 3 of the projection unit 4L enters the left eye EL of the experiencing person M, the image light beam emitted from the projector 3 of the projection unit 4R enters the right eye of the experiencing person M. As will be described later, the projectors 3 of the respective projection units 4L and 4R receive parallax images of an object as a display target which are taken from directions of the projection units 4L and 4R, respectively. Therefore, the experiencing person M can visually recognize a stereoscopic image of the object seen from the directions.

In a case where the experiencing person M moves rightward (moves around the retroreflective sheet 1 in a counterclockwise direction in FIG. 5A) so that the left eye of the experiencing person M is in the visually recognizable region AR of the projection unit 4R, an image light beam from the projection unit 4', which is located at the right side of the projection unit 4R, enters the right eye of the experiencing person M. The projector 3 of the projection unit 4' also receives a parallax image of the object which is taken from a direction of the projection unit 4'. Therefore, the experiencing person who moves rightward can visually recognize a different stereoscopic image of the object seen from the direction.

Reference is made to FIG. 5B. In order to allow the experiencing person M to visually recognize such a stereoscopic image described above, preferably, an angle $\theta_I$ formed by the two projection units 4L and 4R for projecting the left and right parallax images and a center So of the retroreflective sheet 1 is set to an appropriate value. Herein, the angle $\theta_I$ is set to an angle obtained by the following equation, wherein $D_S$ represents a distance from a center $E_O$ between the eyes of the experiencing person M to the center So of the retroreflective sheet 1 and DEYE represents the distance between the eyes. For example, in a case where the distance between the eyes is 63 mm and the distance from the center between the eyes to the center So of the retroreflective sheet 1 is 400 mm, the arrangement angle $\theta_I$ between the adjacent projection units 4L and 4R is about 9°.

$$\theta_I = 2\mathrm{Tan}^{-1} \frac{D_{eye}/2}{D_S}$$

Figure 6:
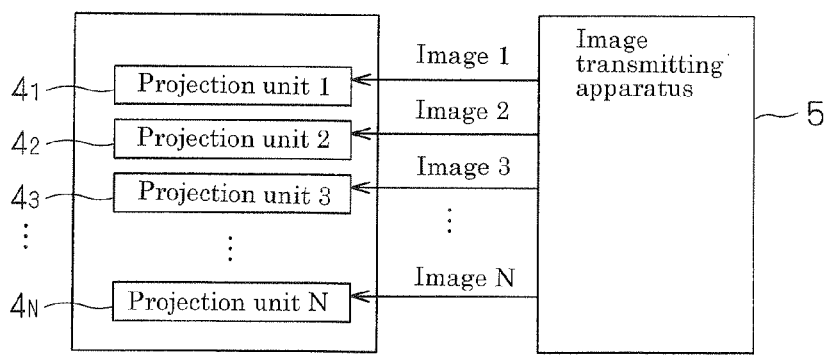
FIG. 6 is a block diagram showing a relation between an image transmitting apparatus and the respective projection units.
Figure 7A:
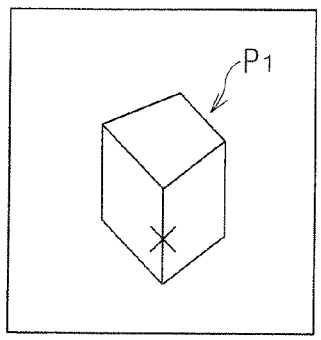
FIGS. 7A to 7C are views each showing a parallax image transmitted from the image transmitting apparatus.
Figure 7B:
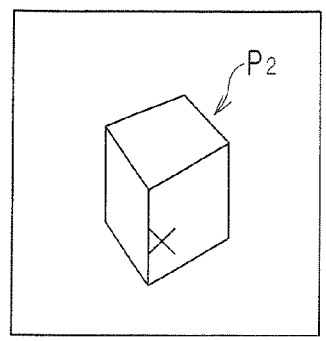
Figure 7C:
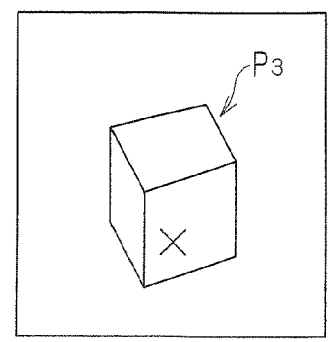

Next, description will be given of an image transmitting apparatus that transmits images to the projectors 3 of the respective projection units 4. FIG. 6 is a block diagram showing a relation between the image transmitting apparatus 5 and the respective projection units 4 ($4_1$, $4_2$, $4_3$, ... $4_N$). As shown in FIGS. 7A to 7C, the image transmitting apparatus 5 transmits parallax images $P_1$, $P_2$, $P_3$, ... taken along a circumferential direction of the object from the directions corresponding to the arrangement positions of the respective projection units 4 ($4_1$, $4_2$, $4_3$, ... $4_N$) to the projectors 3 of the respective projection units 4 in accordance with the arrangement positions of the respective projection units 4. In FIGS. 7A to 7C, a mark "X" is a portion corresponding to a focal point upon taking the images of the object. In the case where the arrangement angle between the adjacent projection units 4 is 9°, the parallax images $P_1$, $P_2$, $P_3$, ... are obtained while being taken along the circumferential direction of the object at intervals of 9°. These parallax images $P_1$, $P_2$, $P_3$, ... are given to the projectors 3 of the respective projection units 4, so that the plurality of experiencing persons M can visually recognize, at one time, stereoscopic images of the object, each of which corresponds to the position of each experiencing person M, in the visually recognizable regions around the entire periphery of the retroreflective sheet 1.

<Second Embodiment>

Figure 8:
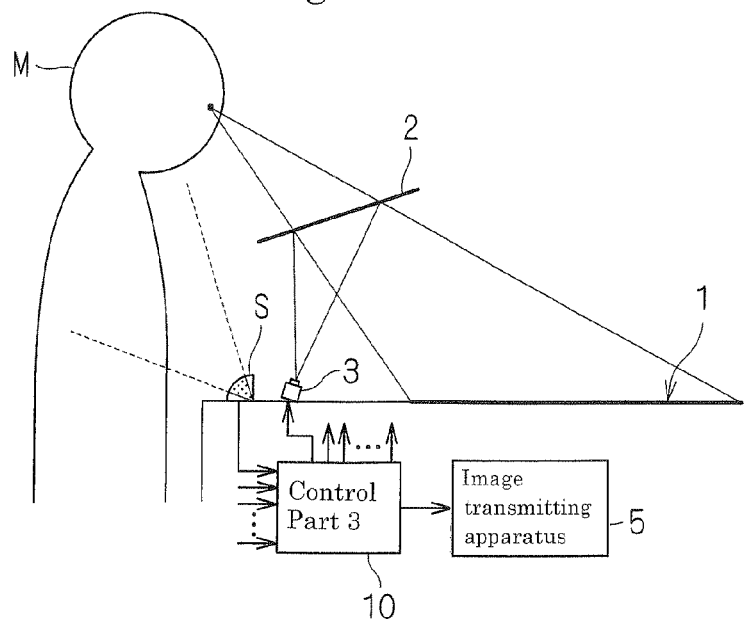
FIG. 8 is a side view showing the main components of a stereoscopic image display system according to a second embodiment.
Figure 9:
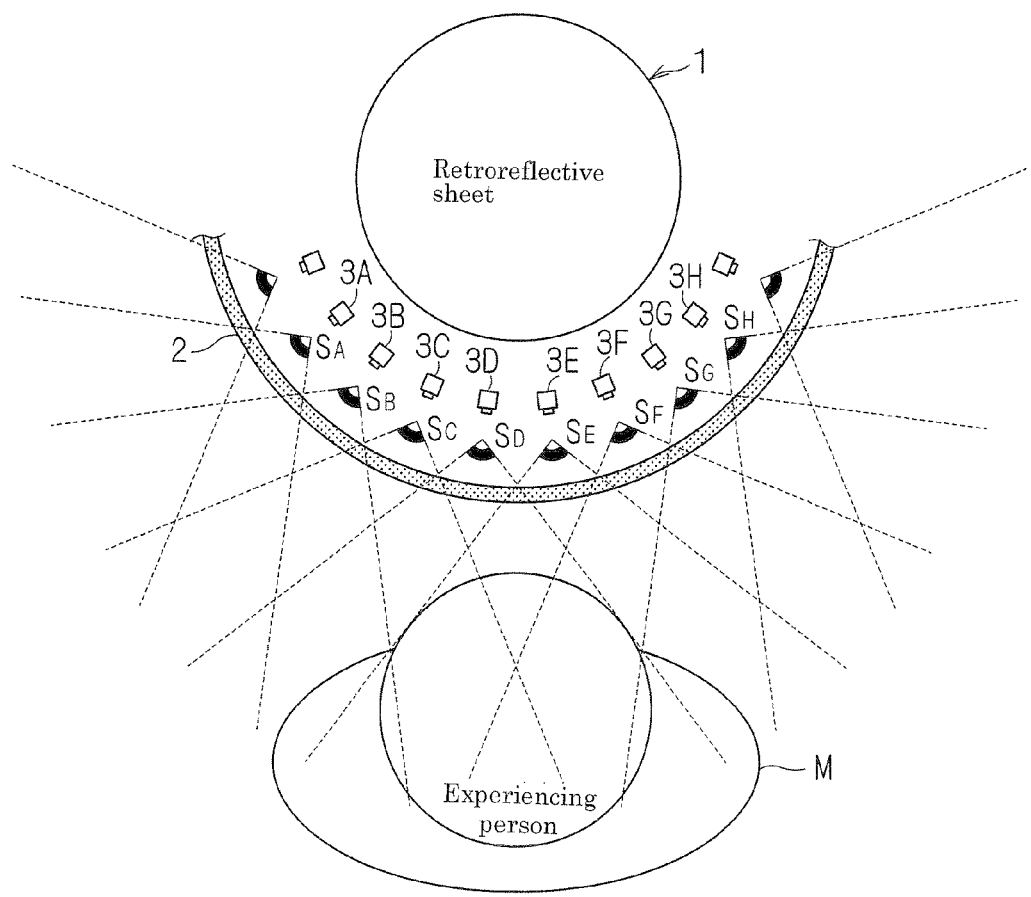
FIG. 9 is a plan view showing the main components of the stereoscopic image display system according to the second embodiment.

With reference to FIG. 8 and FIG. 9, description will be given of a stereoscopic image display system according to a second embodiment.

FIG. 8 and FIG. 9 are a side view and a plan view each showing the main components of the stereoscopic image display system according to the second embodiment.

This stereoscopic image display system is characterized in that an experiencing person detection sensor S for detecting an experiencing person M in the visually recognizable region around the periphery of the retroreflective sheet 1 is added to the stereoscopic image display system described in the first embodiment. A plurality of experiencing person detection sensors S are provided around the periphery of the retroreflective sheet 1 at intervals which are similar to those of the projection units 4. Each experiencing person detection sensor S is directed from the side of the retroreflective sheet 1 toward a direction on which the experiencing person M will stand. The experiencing person detection sensor S may be an infrared sensor, a CCD camera or the like. The experiencing person detection sensor S equates to the experiencing person detection part according to this invention.

Each experiencing person detection sensor S sends a detection signal to a control part 10. In a case where the experiencing person detection sensor S detects the experiencing person M, the control part 10 feeds electric power to only the projectors 3 of the projection units 4 corresponding to the position of the detected experiencing person M to activate the projectors 3, but stops electric power feed to the projectors 3 of the remaining projection units 4 to deactivate the projectors 3. Moreover, the control part 10 controls the image transmitting apparatus 5 to allow the image transmitting apparatus 5 to transmit the images to only the projectors 3 of the projection units 4 corresponding to the position of the detected experiencing person M. In this embodiment, at least two experiencing person detection sensors S (the sensors $S_D$ and $S_E$ in the example shown in FIG. 9) directed toward two visually recognizable regions in correspondence with eyes of an experiencing person detects the experiencing person M. Therefore, the projectors 3 (the projectors $3_D$ and $3_E$ in the example shown in FIG. 9) of the two projection units 4 corresponding to the two visually recognizable regions become activate. It is to be noted that the control part 10 equates to the control part according to this invention.

With this configuration, the projection unit 4 provided in the direction of absence of the experiencing person M receives no electric power. Therefore, it is possible to suppress wasteful power consumption and to lessen a burden on the image transmitting apparatus 5 upon transmission of images.

<First Modified Example of Second Embodiment>

Occasionally, the projector 3, which is deactivated (turned off) by the power saving process described above, fails to achieve satisfactory brightness promptly even when being turned on immediately. Moreover, since the image transmitting apparatus 5 must generate a stereoscopic image again, the deactivated projection unit 4 requires a certain time to display an image again. These factors cause disadvantages upon display of a stereoscopic image.

In the system shown in FIG. 9, for example, it is assumed that only the experiencing person detection sensors $S_D$ and $S_E$ detect the experiencing person M and only the projectors $3_D$ and $3_E$ corresponding to the experiencing person detection sensors $S_D$ and $S_E$ are activated to project images. Immediately afterward, if the experiencing person M moves leftward, that is, moves to a range covered by the experiencing person detection sensors $S_C$ and $S_D$, the foregoing factors cause delay of projection of the image from the projector $3_C$ corresponding to the experiencing person detection sensor $S_C$, resulting in such a phenomenon that no image is projected onto the left eye of the experiencing person M and the experiencing person M fails to visually recognize a stereoscopic image.

In order to avoid this disadvantage, a lateral width of a detectable range of each experiencing person detection sensor S is widened such that each experiencing person detection sensor S detects an experiencing person in a predetermined area including the visually recognizable region corresponding to each sensor S. For example, the experiencing person detection sensor S shown in FIG. 9 has a detection area shown by broken lines in FIG. 9 and detects an experiencing person M in the detection area. With this configuration, if the experiencing person M is in the position shown in FIG. 9, the experiencing person detection sensors $S_B$ to $S_G$ detect the experiencing person M, so that the projectors $3_B$ to $3_G$ corresponding to the experiencing person detection sensors $S_B$ to $S_G$ are activated to project images. The experiencing person M can not visually recognize images other than those projected by the projectors $3_D$ and $3_E$; however, the projectors 3 of the adjacent projection units 4 are set to project images. Thus, it is possible to avoid the disadvantages caused by the delay of display described above.

<Second Modified Example of Second Embodiment>

In order to prevent erroneous detection by each experiencing person detection sensor S, the experiencing person detection sensors S may be arranged such that detection areas thereof overlap with each other. An area where the experiencing person M can visually recognize a stereoscopic image is limited. Therefore, when the experiencing person M approaches a position where the stereoscopic image is visually recognizable, the plurality of experiencing person detection sensors S detect the experiencing person M.

With this configuration, determinations by the adjacent experiencing person detection sensors S are examined. If one experiencing person detection sensor detects a person who stands at a position distant from the visually recognizable region or erroneously detects a person by change in extraneous light, but the adjoining experiencing person detection sensor S detects no experiencing person, it is determined that the former experiencing person detection sensor S erroneously detects the experiencing person. In the example shown in FIG. 9, for example, it is assumed that only the experiencing person detection sensor $S_D$ detects an experiencing person. In a case where the person is in the visually recognizable region corresponding to the experiencing person detection sensor $S_D$, the plurality of experiencing person detection sensors S (e.g., sensors $S_C$ to $S_F$) will detect the person in consideration of the detectable range. Accordingly, if only the experiencing person detection sensor $S_D$ detects an experiencing person, it is determined that the experiencing person detection sensor $S_D$ erroneously detects the experiencing person, leading to avoidance of erroneous operations of the system.

<Third Embodiment>

Description will be given of a stereoscopic image display system according to a third embodiment.

The stereoscopic image display system according to the third embodiment realizes visual recognition of a stereoscopic image by use of a diffused and reflected light beam which returns from the retroreflective sheet 1 in a direction of incidence thereof while being diffused. The stereoscopic image display system according to the third embodiment equates to the stereoscopic image display system according to the second aspect of this invention.

Figure 10:
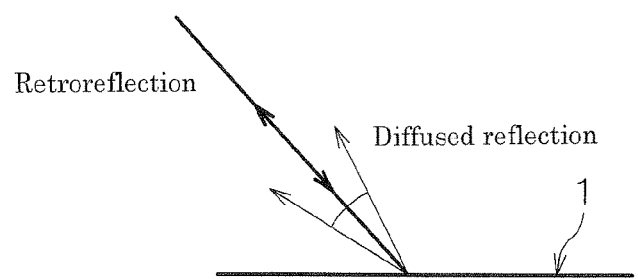
FIG. 10 is a view used for description of a light beam reflected from a retroreflective sheet used in a third embodiment while being diffused.

Reference is made to FIG. 10. FIG. 10 is a view used for description of a light beam reflected from the retroreflective sheet while being diffused. With regard to a light beam which is incident on the retroreflective sheet 1, the entire thereof is not reflected in a direction of incidence thereof (i.e., is not retroreflected), but a part thereof is reflected while being diffused about the direction of incidence, depending on the accuracy of the retroreflective sheet 1.

Figure 11A:
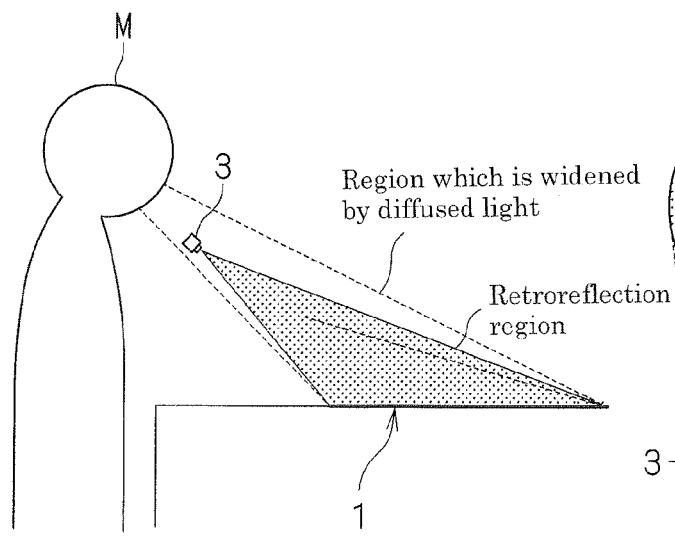
FIG. 11A and FIG. 11B are a side view and a plan view each showing the main components of a stereoscopic image display system according to the third embodiment.
Figure 11B:
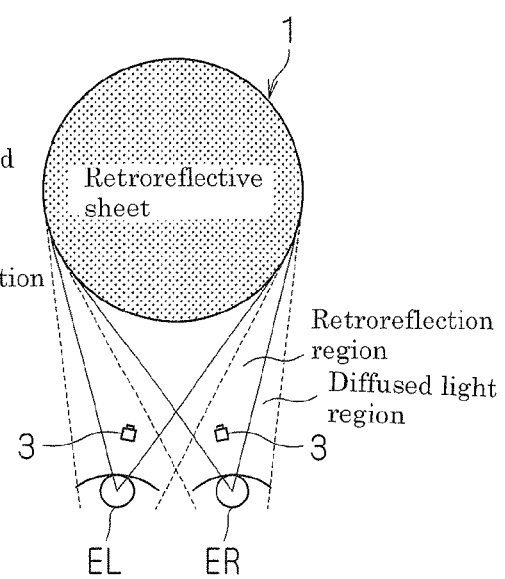

The stereoscopic image display system according to this embodiment is described with reference to FIGS. 11A and 11B. FIG. 11A and FIG. 11B are a side view and a plan view each showing the main components of the stereoscopic image display system according to the third embodiment. In the stereoscopic image display system according to this embodiment, the projector 3 emits an image light beam, toward the retroreflective sheet 1, from the line of sight of the experiencing person M who sees the retroreflective sheet 1 in the visually recognizable region set previously around the periphery of the retroreflective sheet 1. The third embodiment is similar to the first embodiment in the following points. That is, the plurality of projectors 3 are provided around the periphery of the retroreflective sheet 1 at the intervals set such that the distance between the visually recognizable regions corresponding to the adjacent projectors 3 becomes equal to the distance between the eyes of the experiencing person M. Moreover, the image transmitting apparatus 5 transmits the parallax images of the object as the display target, which are taken along the circumferential direction of the object from the directions corresponding to the arrangement positions of the respective projectors 3, to the respective projectors 3 in accordance with the arrangement positions of the respective projectors 3.

When the position where the experiencing person M is present, that is, the left and right eyes of the experiencing person M are in the visually recognizable region, for example, the image light beam emitted from the projector 3 of the projection unit 4 corresponding to the position of the right eye enters the plane of incidence 1a of the retroreflective sheet 1. The image light beam enters the retroreflective sheet 1, is reflected in the direction of incidence thereof, and returns to the projector 3. Consequently, the projector 3 disadvantageously blocks the image light beam, and the experiencing person M fails to visually recognize the light beam retroreflected from the retroreflective sheet 1. However, the diffused and reflected light beam, which is reflected from the retroreflective sheet 1 while being diffused and then returns in the direction of incidence thereof, enters the eye (herein, the right eye) of the experiencing person M. Likewise, the image light beam emitted from the projector 3 of the projection unit 4 corresponding to the position of the left eye is reflected from the retroreflective sheet 1, and the diffused and reflected light of the reflected light enters the left eye of the experiencing person M. The two projectors 3 described above receive the parallax images of the object, which are taken from the directions corresponding to the arrangement positions of the two projection units 4, from the image transmitting apparatus 5. Therefore, the experiencing person can visually recognize the stereoscopic image of the object seen from the direction of presence of the experiencing person. Likewise, another experiencing person in a different position (a different visually recognizable region) around the periphery of the retroreflective sheet 1 can also visually recognize a stereoscopic image of the object seen from a direction of presence of the experiencing person.

The stereoscopic image display system according to this embodiment utilizes the light reflected from the retroreflective sheet 1 while being diffused and adopts no half mirror. As a result, the stereoscopic image display system according to this embodiment allows simplification of the configuration thereof as compared with that according to the first embodiment.

<Fourth Embodiment>

Description will be given of a stereoscopic image display system according to a fourth embodiment.

A feature of the stereoscopic image display system according to the fourth embodiment is a special retroreflective sheet 1' that retroreflects an incident light beam while refracting the incident light beam upward or downward. The stereoscopic image display system according to the fourth embodiment equates to the stereoscopic image display system according to the third aspect of this invention.

Figure 12:
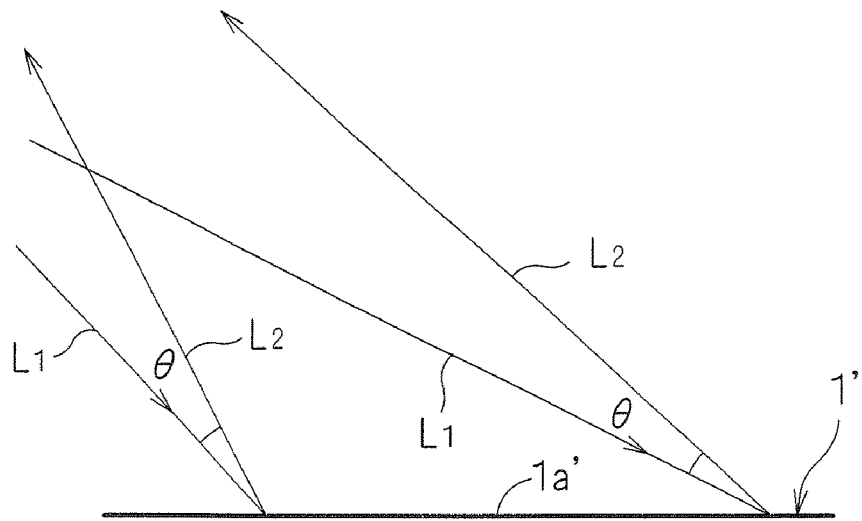
FIG. 12 is a view showing refraction and reflection at a retroreflective sheet used in a fourth embodiment.

With reference to FIG. 12, description will be given of the retroreflective sheet 1' used in this embodiment. FIG. 12 is a view showing refraction and reflection at the retroreflective sheet 1' used in the fourth embodiment. The retroreflective sheet 1' has a plane of incidence 1a' oriented in a substantially horizontal direction. The retroreflective sheet 1' changes a light beam L1 which is incident on the plane of incidence 1a' into a light beam L2 which is reflected in a direction equal to the direction of incidence in plan view, but is refracted upward at an angle θ in side view as shown in FIG. 12.

Figure 13:
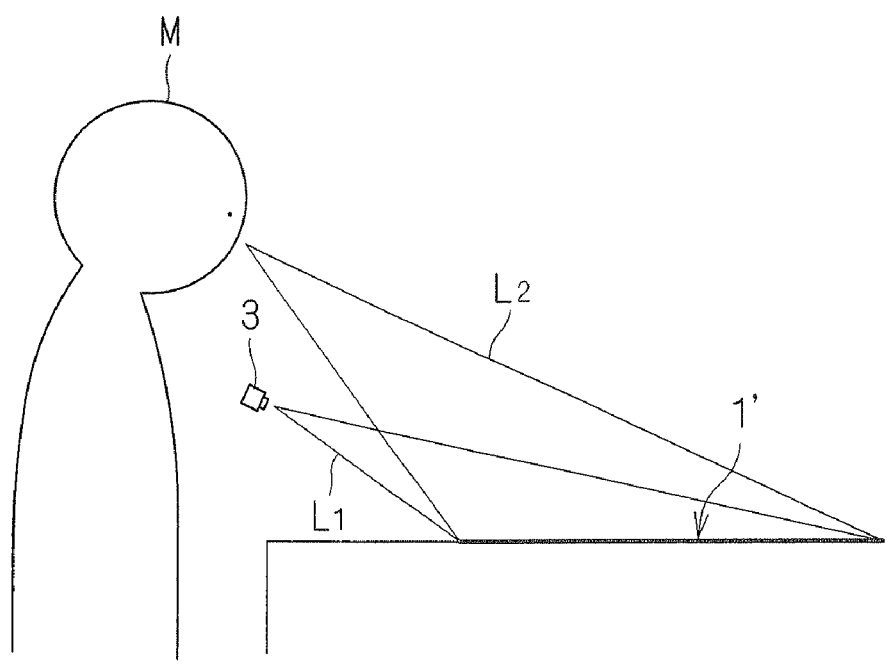
FIG. 13 is a side view showing the main components of a stereoscopic image display system according to the fourth embodiment.

Reference is made to FIG. 13. FIG. 13 is a side view showing the main components of the stereoscopic image display system according to the fourth embodiment. The projector 3 emits an image light beam toward the retroreflective sheet 1' having the characteristic described above. Herein, the projector 3 emits the image light beam toward the retroreflective sheet 1' in a direction, in plan view, equal to a line of sight of the experiencing person M who sees the retroreflective sheet 1' in a visually recognizable region set previously around a periphery of the retroreflective sheet 1' from a position, in side view, deviating downward or upward (downward in this embodiment) from a region where the light beam reflected from the retroreflective sheet 1' passes. The fourth embodiment is similar to the first embodiment in the following points. That is, the plurality of projectors 3 are provided around the periphery of the retroreflective sheet 1 at the intervals set such that the distance between the visually recognizable regions corresponding to the adjacent projectors 3 becomes equal to the distance between the eyes of the experiencing person M. Moreover, the image transmitting apparatus 5 transmits the parallax images of the object as the display target, which are taken along the circumferential direction of the object from the directions corresponding to the arrangement positions of the respective projectors 3, to the respective projectors 3 in accordance with the arrangement positions of the respective projectors 3.

With this configuration, the image light beam is emitted from the projector 3 corresponding to the position where the experiencing person M is present, is refracted slightly upward from the retroreflective sheet 1', and returns in the direction of incidence thereof in plan view.

Accordingly, the reflected light beam L2 returns while passing over the projector 3; therefore, the projector 3 does not block the reflected light beam L2. Thus, the reflected light beam L2 is reflected from the retroreflective sheet 1' while being refracted and then enters the eye of the experiencing person. The parallax image light beams emitted from the projectors 3 of the adjacent projection units 4 are separately enter the left and right eyes of the experiencing person M, so that the experiencing person can visually recognize the stereoscopic image of the object seen from the direction of presence of the experiencing person. Likewise, another experiencing person in a different position (a different visually recognizable region) around the periphery of the retroreflective sheet 1' can also visually recognize a stereoscopic image of the object seen from a direction of presence of the experiencing person.

The stereoscopic image display system according to this embodiment utilizes the light beam reflected from the retroreflective sheet 1' while being refracted and therefore can prevent degradation in brightness of the stereoscopic image to be recognized visually. Further, the stereoscopic image display system according to this embodiment adopts no half mirror 2 and therefore allows simplification of the configuration thereof. In addition, the position of the projector 3 is lower than the position of the eyes of the experiencing person; therefore, the projector 3 does not obstruct the field of view of the experiencing person.

With reference to FIG. 14 to FIG. 16B, next, description will be given of examples of the configuration of the retroreflective sheet 1' described above.

Figure 14:
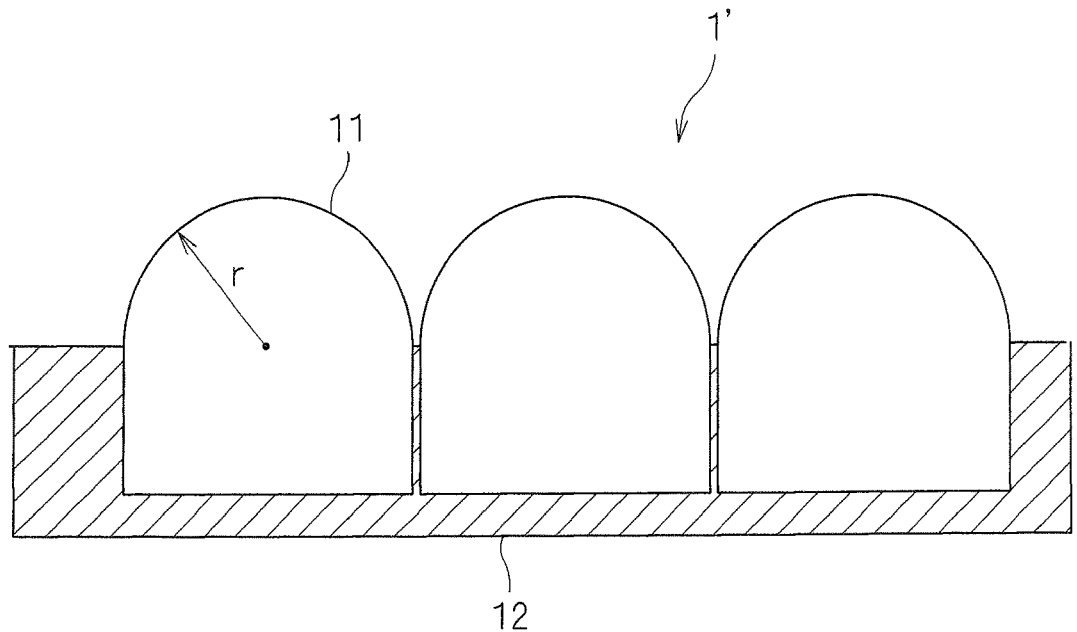
FIG. 14 is a partly enlarged sectional view showing the retroreflective sheet used in the fourth embodiment.
Figure 15:
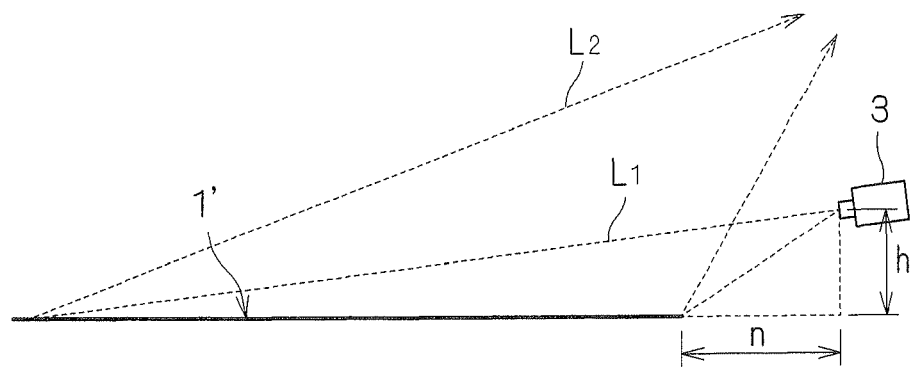
FIG. 15 is a view showing an arrangement relation between the retroreflective sheet and a projector used in the fourth embodiment.

FIG. 14 is a partly enlarged sectional view showing the retroreflective sheet 1' used in the fourth embodiment. FIG. 15 is a view showing an arrangement relation between the retroreflective sheet 1' and the projector 3. FIG. 16A and FIG. 16B are a side view and a plan view each used for description of reflection of a light beam at a bullet-shaped glass bead.

The retroreflective sheet 1 described in the first embodiment adopts the spherical glass beads. On the other hand, the retroreflective sheet 1' described in this embodiment adopts bullet-shaped glass beads 11 rather than the spherical glass beads. As in the case of the retroreflective sheet 1 described in the first embodiment, an index of refraction is set such that a focal length f is equal in length to a radius r of a dome portion of the glass bead 11. The large number of bullet-shaped glass beads 11 are formed entirely on a sheet-like total reflection member 12. By use of the bullet-shaped glass bead 11, as shown in FIGS. 16A and 16B, a light beam $LA_1$, which is incident at an angle shallower (smaller) than 45° with respect to a horizontal plane, is reflected as a reflected light beam $LA_2$ having an angle of reflection larger than the angle of incidence. Moreover, a light beam $LB_1$, which is incident at an angle deeper (larger) than 45° with respect to the horizontal plane, is reflected as a reflected light beam $LB_2$ having an angle of reflection shallower (smaller) than the angle of incidence. Further, a light beam $LC_1$, which is incident at an angle of 45° with respect to the horizontal plane, is reflected as a reflected light beam $LC_2$ having an angle of reflection equal to the angle of incidence.

In this embodiment, all the image light beams from the projectors 3 enter the retroreflective sheet 1' at an angle within 45°. As shown in FIG. 15, more specifically, the positional relation between the retroreflective sheet 1' and the projector 3 is set such that a distance n from the projector 3 to the retroreflective sheet 1' becomes longer than a height h of the projector 3.

This invention is not limited to the foregoing embodiments and may be embodied variously as follows.

(1) The experiencing person detection sensor S and the control part 10 each described in the second embodiment may be applied to each of the stereoscopic image display systems according to the third and fourth embodiments.

(2) In the foregoing embodiments, the visually recognizable region A is set around the entire periphery of the retroreflective sheet 1. However, the visually recognizable region A is not necessarily set around the entire periphery of the retroreflective sheet 1. For example, the visually recognizable region A may be set at only the front half (the range within an angle of 180°) of the periphery of the retroreflective sheet 1. In the case where the setting range of the visually recognizable region A is limited at the periphery of the retroreflective sheet 1, the number of projection units 4 each including the half mirror 2 and the projector 3 is reduced in accordance with the limited range in the first embodiment. Similarly, the number of parallax images of the object to be prepared is also reduced in accordance with the reduced number of projection units 4. The same things hold true for the remaining embodiments.

(3) In the foregoing embodiments, the parallax image of the object as the display target is obtained while being actually taken along the circumferential direction of the object. Alternatively, the circumferential parallax image of the object may be computer graphics created by 3-D CAD (Computer-Aided Design) and the like.

This invention may be embodied in other specific forms without departing from the spirit or essential attributes thereof and, accordingly, reference should be made to the appended claims, rather than to the foregoing specification, as indicating the scope of this invention.

What is claimed is:

1. A stereoscopic image display system that directs images with binocular parallax separately at left and right eyes of an experiencing person to allow the experiencing person to visually recognize a stereoscopic image, the system comprising:
a retroreflection optical part having a plane of incidence oriented in a substantially horizontal direction that is perpendicular to the experience person's upper body, and reflecting a light beam, which is incident on the plane of incidence, in a direction of incidence of the incident light beam;
a half mirror disposed so as to traverse a field of view of an experiencing person who sees the retroreflection optical part in a visually recognizable region set previously around a periphery of the retroreflection optical part;
an image light beam emission part emitting an image light beam toward the half mirror from an opposite side to a side where the experiencing person is present; and
an image transmission part transmitting an image to the image light beam emission part, wherein
the half mirror reflects, toward the retroreflection optical part, the image light beam emitted from the image light beam emission part,
the image light beam emission part and the half mirror are in a positional relation set such that the image light beam reflected from the half mirror becomes optically conjugate with the field of view of the experiencing person,
a plurality of projection units each including the half mirror and the image light beam emission part are arranged around the periphery of the retroreflection optical part at intervals set such that a distance between the visually recognizable regions corresponding to the adjacent projection units becomes equal to a distance between eyes of the experiencing person, and
the image transmission part transmits parallax images of an object as a display target seen from directions corresponding to the arrangement positions of the respective projection units to the image light beam emission parts of the respective projection units in accordance with the arrangement positions of the respective projection units.

2. The stereoscopic image display system according to claim 1, further comprising:
an experiencing person detection part detecting an experiencing person in the visually recognizable region around the periphery of the retroreflection optical part; and
a control part, when the experiencing person detection part detects the experiencing person, activating only the image light beam emission parts corresponding to the position of the detected experiencing person and deactivating the remaining image light beam emission parts.

3. The stereoscopic image display system according to claim 1, further comprising:
an experiencing person detection part detecting an experiencing person in a predetermined area including the visually recognizable region around the periphery of the retroreflection optical part; and
a control part, when the experiencing person detection part detects the experiencing person, activating the image light beam emission parts corresponding to the position of the detected experiencing person and the image light beam emission parts located in the predetermined area and deactivating the remaining image light beam emission parts located outside the predetermined area.

4. The stereoscopic image display system according to claim 2, wherein
the experiencing person detection part includes a plurality of sensors for detecting an experiencing person, and
the control part activates the image light beam emission part when all the plurality of sensors detect the experiencing person.

5. The stereoscopic image display system according to claim 3, wherein
the experiencing person detection part includes a plurality of sensors for detecting an experiencing person, and
the control part activates the image light beam emission part when all the plurality of sensors detect the experiencing person.

6. A stereoscopic image display system that directs images with binocular parallax separately at left and right eyes of an experiencing person to allow the experiencing person to visually recognize a stereoscopic image, the system comprising:
a retroreflection optical part having a plane of incidence oriented in a substantially horizontal direction that is perpendicular to the experiencing person's upper body, and reflecting a light beam, which is incident on the plane of incidence, in a direction of incidence of the incident light beam;

an image light beam emission part emitting an image light beam toward the retroreflection optical part along a line of sight of an experiencing person who sees the retroreflection optical part in a visually recognizable region set previously around a periphery of the retroreflection optical part; and an image transmission part transmitting an image to the image light beam emission part, wherein a plurality of image light beam emission parts each equal in configuration to the image light beam emission part are arranged around the periphery of the retroreflection optical part at intervals set such that a distance between the visually recognizable regions corresponding to the adjacent image light beam emission parts becomes equal to a distance between eyes of the experiencing person, and the image transmission part transmits parallax images of an object as a display target seen from directions corresponding to the arrangement positions of the respective image light beam emission parts to the respective image light beam emission parts in accordance with the arrangement positions of the respective image light beam emission parts.

7. The stereoscopic image display system according to claim 6, further comprising:

an experiencing person detection part detecting an experiencing person in the visually recognizable region around the periphery of the retroreflection optical part; and a control part, when the experiencing person detection part detects the experiencing person, activating only the image light beam emission parts corresponding to the position of the detected experiencing person and deactivating the remaining image light beam emission parts.

8. The stereoscopic image display system according to claim 6, further comprising:

an experiencing person detection part detecting an experiencing person in a predetermined area including the visually recognizable region around the periphery of the retroreflection optical part; and a control part, when the experiencing person detection part detects the experiencing person, activating the image light beam emission parts corresponding to the position of the detected experiencing person and the image light beam emission parts located in the predetermined area and deactivating the remaining image light beam emission parts located outside the predetermined area.

9. The stereoscopic image display system according to claim 7, wherein the experiencing person detection part includes a plurality of sensors for detecting an experiencing person, and the control part activates the image light beam emission part when all the plurality of sensors detect the experiencing person.

10. The stereoscopic image display system according to claim 8, wherein the experiencing person detection part includes a plurality of sensors for detecting an experiencing person, and the control part activates the image light beam emission part when all the plurality of sensors detect the experiencing person.

11. A stereoscopic image display system that directs images with binocular parallax separately at left and right eyes of an experiencing person to allow the experiencing person to visually recognize a stereoscopic image, the system comprising:

a retroreflection optical part having a plane of incidence oriented in a substantially horizontal direction that is perpendicular to the experiencing person's upper body, and reflecting a light beam which is incident on the plane of incidence while refracting the light beam in a direction which is equal to a direction of incidence of the incident light beam in plan view, but deviates upward or downward from the direction of incidence in side view;

an image light beam emission part emitting an image light beam toward the retroreflection optical part in a direction, in plan view, equal to a line of sight of an experiencing person who sees the retroreflection optical part in a visually recognizable region set previously around a periphery of the retroreflection optical part from a position, in side view, deviating downward or upward from a region where the light beam reflected from the retroreflection optical part passes; and an image transmission part transmitting an image to the image light beam emission part, wherein a plurality of image light beam emission parts each equal in configuration to the image light beam emission part are arranged around the periphery of the retroreflection optical part at intervals set such that a distance between the visually recognizable regions corresponding to the adjacent image light beam emission parts becomes equal to a distance between eyes of the experiencing person, and the image transmission part transmits parallax images of an object as a display target seen from directions corresponding to the arrangement positions of the respective image light beam emission parts to the respective image light beam emission parts in accordance with the arrangement positions of the respective image light beam emission parts.

12. The stereoscopic image display system according to claim 11, further comprising:

an experiencing person detection part detecting an experiencing person in the visually recognizable region around the periphery of the retroreflection optical part; and a control part, when the experiencing person detection part detects the experiencing person, activating only the image light beam emission parts corresponding to the position of the detected experiencing person and deactivating the remaining image light beam emission parts.

13. The stereoscopic image display system according to claim 11, further comprising:

an experiencing person detection part detecting an experiencing person in a predetermined area including the visually recognizable region around the periphery of the retroreflection optical part; and a control part, when the experiencing person detection part detects the experiencing person, activating the image light beam emission parts corresponding to the position of the detected experiencing person and the image light beam emission parts located in the predetermined area and deactivating the remaining image light beam emission parts located outside the predetermined area.

14. The stereoscopic image display system according to claim 12, wherein the experiencing person detection part includes a plurality of sensors for detecting an experiencing person, and the control part activates the image light beam emission part when all the plurality of sensors detect the experiencing person.

15. The stereoscopic image display system according to claim 13, wherein the experiencing person detection part includes a plurality of sensors for detecting an experiencing person, and the control part activates the image light beam emission part when all the plurality of sensors detect the experiencing person.

* * * * *